(12) United States Patent
Rice et al.

(10) Patent No.: US 7,088,743 B2
(45) Date of Patent: Aug. 8, 2006

(54) LASER SOURCE COMPRISING AMPLIFIER AND ADAPTIVE WAVEFRONT/POLARIZATION DRIVER

(75) Inventors: Robert R. Rice, Simi Valley, CA (US); Michael G. Wickham, Rancho Palos Verdes, CA (US); Hiroshi Komine, Torrance, CA (US)

(73) Assignee: Northrop Grumman Corp., Los Angeles, CA (US)

( * ) Notice: Subject to any disclaimer, the term of this patent is extended or adjusted under 35 U.S.C. 154(b) by 193 days.

(21) Appl. No.: 10/801,902

(22) Filed: Mar. 15, 2004

(65) Prior Publication Data

US 2005/0201429 A1   Sep. 15, 2005

(51) Int. Cl.
*H01S 3/30* (2006.01)
*H01S 3/10* (2006.01)
*H01S 3/91* (2006.01)
*H01S 3/00* (2006.01)

(52) U.S. Cl. ............................. 372/6; 372/27; 372/70; 359/349; 359/337

(58) Field of Classification Search .................... 372/6, 372/27, 70; 359/349, 337
See application file for complete search history.

(56) References Cited

U.S. PATENT DOCUMENTS

| | | | | |
|---|---|---|---|---|
| 5,369,661 A | * | 11/1994 | Yamaguchi et al. | .......... 372/69 |
| 5,513,201 A | * | 4/1996 | Yamaguchi et al. | .......... 372/75 |
| 5,694,408 A | | 12/1997 | Bott et al. | |
| 6,200,309 B1 | | 3/2001 | Rice et al. | |

FOREIGN PATENT DOCUMENTS

| | | |
|---|---|---|
| EP | 0 952 642 A2 | 10/1999 |
| EP | 0 980 123 A2 | 2/2000 |
| FR | 2 834 136 A1 | 6/2003 |
| WO | WO 2003055016 A2 * | 7/2003 |

OTHER PUBLICATIONS

Word reference. http://www.Wordreference.com (French to English dictionary for selected words, Specifically Fibre optiique, among others).*

DoD and Information Technology (DoD/IT) Acronyms, showing acronym for PILOT (Phased Integrated Laser Optics Technology), published on the Worldwide Web at http://www.dacs.dtic.mil/datbases/acronym/ (no other information available concerning PILOT).

International Search Report for corresponding PCT/US2005/007193 completed Jul. 19, 2005 by S. Lendroit of the EPO.

* cited by examiner

*Primary Examiner*—Minsun Harvey
*Assistant Examiner*—Jeffrey Lane
(74) *Attorney, Agent, or Firm*—Tarolli, Sundheim, Covell & Tummino LLP

(57) ABSTRACT

A hybrid laser source including a solid state laser driven by an array of fiber laser amplifiers, the inputs of which are controllable in phase and polarization, to compensate for distortions that arise in the solid state laser, or to achieve desired output beam properties relating to direction or focus. The output beam is sampled and compared with a reference beam to obtain phase and polarization difference signals across the output beam cross section, at spatial positions corresponding with the positions of the fiber laser amplifiers providing input to the solid state laser. Therefore, phase and polarization properties of the output beam may be independently controlled by predistortion of these properties in the fiber laser amplifier inputs.

13 Claims, 2 Drawing Sheets

US 7,088,743 B2

LASER SOURCE COMPRISING AMPLIFIER AND ADAPTIVE WAVEFRONT/POLARIZATION DRIVER

BACKGROUND OF THE INVENTION

This invention relates generally to high power laser sources and, more particularly, to solid state lasers or fiber phased array lasers that are scalable to high powers. There is a significant need for high power laser sources for both military and industrial applications, such as directed energy weapons (DEW) systems, ladar and illuminators, as well as industrial cutting, welding and material processing. Scalable laser technologies under development fall into two principal categories: bulk crystal solid state lasers (SSL) and fiber phased array sources. In the bulk crystal group, slab lasers, rod lasers, disk lasers and heat capacity lasers are all under active consideration. In the fiber laser area, there are approaches that feature active near field beam control, far field beam control, passive beam combining using pulse code modulation (PCM) technology and nonlinear beam combining. The bulk crystal approaches suffer from thermo-optical distortions of the laser medium that render the output beams unacceptable, though fabrication of high power SSL devices has been demonstrated. Fiber array approaches, on the other hand, promise exquisite control of the output wavefront, but require control systems that are complex and to a large degree yet unproven.

Therefore, there is still a significant need to provide a high power laser source that avoids the drawbacks of the two principal approaches. Ideally, what is needed is a laser source scalable to high powers in the manner of solid state lasers, but retaining the desirable beam control features of fiber phased arrays. The present invention is directed to this end.

SUMMARY OF THE INVENTION

The present invention resides in a hybrid approach to laser power scaling that enables the use of simple high power amplifiers, but retains the desirable beam control features of fiber phased arrays. Briefly, and in general terms, the laser source of the present inventions comprises a solid state laser amplifier providing a high power output beam; an array of laser fiber amplifiers providing an input beam to the solid state laser; a phase and polarization sensor, for sensing phase and polarization variations in a cross section of the output beam from the solid state laser; and means for controlling phase and polarization of elements of the array of laser fiber amplifiers, to achieve phase and polarization control through the cross section of the output beam. Precise phase and polarization control is effected even when the output beam is of high power.

More specifically, the phase and polarization sensor comprises means for sampling the output beam throughout its cross section, and means for comparing the phase and polarization of output beam samples with a reference beam. The means for controlling phase and polarization comprises separate phase and polarization control elements for each element of the array of laser fiber amplifiers. Usually, the output beam phase and polarization is conformed to phase and polarization qualities of the reference beam.

As disclosed, the reference beam and multiple inputs to the array of laser fiber amplifiers are all derived from a common master oscillator. In the disclosed embodiment of the invention, the array of laser fiber amplifiers comprises multiple inputs derived from a common master oscillator; a diode pump source coupled to the laser fiber amplifiers to provide pump power; and an array of collimating lenses coupled to corresponding fiber outputs and arranged in a closely packed configuration to launch the multiple fiber outputs as an input to the solid state laser.

The solid state laser may be of any convenient shape, such as a rod laser, a slab laser, a disk laser and a heat capacity laser. Ideally, the phase and polarization sensor comprises a beam sampler for obtaining a sample of the output beam; a reference beam source derived from the common master oscillator; optical means for comparing the sample of the output beam with the reference beam; and a sensor lens array for spatially sampling the sensed phase and polarization differences across the output beam cross section.

The invention may also be defined in terms of a method for generating a laser beam of high power and good beam quality, comprising the steps of generating a seed beam of desired beam quality and spectral content; applying the seed beam to multiple fiber laser amplifiers; pumping the fiber laser amplifiers to produce an array of amplified output beams from the fiber laser amplifiers; focusing the output beams from the fiber laser amplifiers into a solid state laser; pumping the solid state laser to produce a composite output beam; sampling the composite output beam and sensing phase and polarization differences at a plurality of spatial positions in a cross section of the composite output beam, the spatial positions corresponding to the positions of the fiber laser amplifiers providing input to the solid state laser; generating phase and polarization control signals corresponding to the sensed polarization differences; and predistorting the phase and polarization of the seed beam applied to the inputs of the fiber laser amplifiers, to achieve desired phase and polarization properties in the output beam from the solid state amplifier.

In a disclosed embodiment of the invention, the sensed phase and polarization differences result from a comparison between the phase and polarization of a reference signal and the phase and polarization properties sampled in the cross section of the solid state laser output signal. Thus, the step of predistorting the phase and polarization has the effect of compensating of phase and polarization distortions arising in the solid state laser.

Alternatively, or in addition, the step of predistorting the phase has the effect of achieving a desired change in wavefront tilt or focus of the solid state laser output beam. Thus the output beam may be steered to a limited extent, or focused as desired in a particular application.

It will be appreciated from the foregoing that the present invention represents a significant advance in the field of high power lasers. In particular, the invention combines the advantages and simplicity of solid state lasers with the desirable beam control features of laser fiber amplifier arrays. The resulting hybrid laser source is conveniently controllable in phase and polarization to achieve a high power output beam of good quality and having other desired wavefront properties. Other aspects and advantages of the invention will become apparent from the following more detailed description, taken in conjunction with the accompanying drawings.

DESCRIPTION OF THE PREFERRED EMBODIMENT

Figure 1:
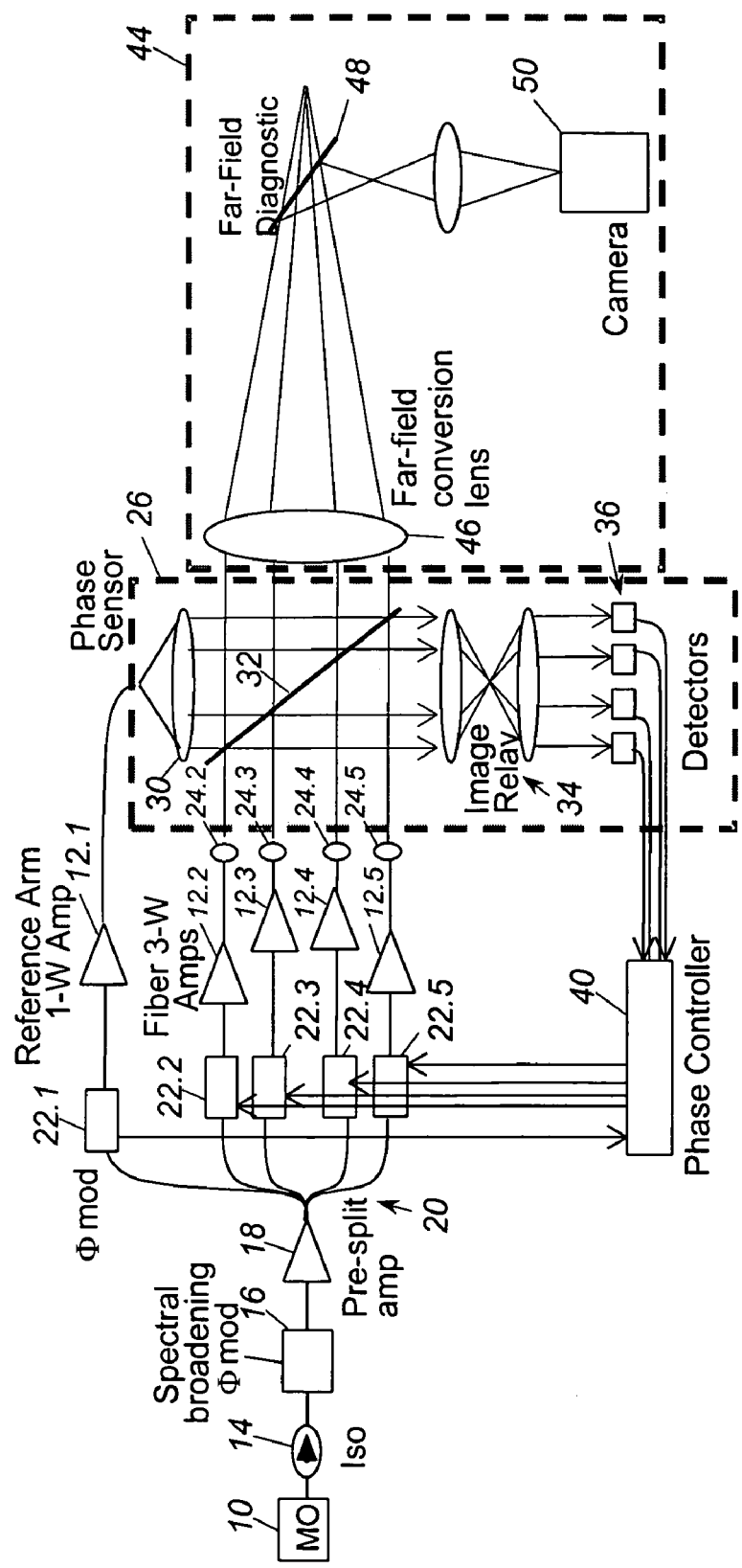
FIG. 1 is a schematic diagram of coherent fiber laser array of the prior art.

As shown in the drawings for purposes of illustration, the present invention is concerned with laser sources scalable to high powers, for any of a variety of applications in both military and industrial fields. FIG. 1 shows a scalable fiber laser architecture in which a master oscillator (MO), indicated by reference numeral 10, defines the spectrum and modulation waveform of light that is distributed to an array of high power fiber amplifiers, of which five are shown, as indicated by numerals 12.1–12.5. Associated with the master oscillator 10 are an optical isolator 14, a spectral broadening phase modulator 16 and a pre-split amplifier 18. The output of the pre-split amplifier 18 is divided into multiple optical paths, as indicated diagrammatically at 20, and each path passes through a phase modulator, indicated by 22.1–22.5. The fiber amplifiers 12 are pumped by laser diode arrays (not shown) and the output beams from the fiber amplifiers are combined in a closely packed lens array, indicated diagrammatically by four lenses 24.2–24.5. The combined output beams are then processed by a phase sensor, indicated generally by the rectangle 26. In the illustrated architecture, one of the optical paths, including fiber amplifier 12.1, is used as a phase reference arm. The output from this amplifier 12.1 is not combined with the others in lens array 24, but is directed through a lens 30 in the phase sensor 26 and interfered with samples of each of the other beam outputs from the fiber amplifiers 12.2–12.5. The phase sensor 26 also includes a partially reflective mirror 32, which samples the output beams, an image relay 34, and an array of optical detectors 36. The detectors 36 provide a set of phase measurements to a phase controller 40, which in turn generates phase correction signals to the phase modulators 22.2–22.5. Also shown in FIG. 1 are far-field diagnostic optics 44, including a far-field conversion lens 46 for focusing the composite output beam, a partially reflective mirror 48 for sampling the output beam, and a camera 50.

In the FIG. 1 architecture, samples of the output beam are compared on the detector array 36 to a frequency shifted reference wavefront derived from the master oscillator 10 through the reference arm amplifier 12.1, to provide a measurement of the instantaneous phase of each fiber emitter in the array, each of which is then corrected in real time to form the output beam. In this architecture, the wavelength of operation is restricted by the gain bandwidth of the rare earth dopant used in the fiber core, which for the most efficient designs using Yb or Nd as the fiber dopant happens to fall in the region of 1000 nm to 1100 nm.

Fiber laser devices have the advantage that they are highly efficient (up to 85%) in converting laser diode pump power to high brightness (good beam quality) output power and they can be packaged in compact modules. Although this type of architecture works well at low and moderate power output levels, problems arise at higher powers, such as nonlinear effects, polarization control and the ability to sense and control wavefront characteristics at high speed.

In accordance with the present invention, the fiber amplifier architecture is used as the input to a conventional bulk solid state laser (SSL) amplifier device of simple design and relatively low fabrication cost. In brief, the wavefront generated by a fiber array is tailored to compensate for thermo-optic distortions induced in the SSL amplifier device by dissipation of pump power and other losses. It is well known that temperature gradients in a strongly pumped solid state medium distort its refractive index and can depolarize transmitted light, which can lead to significantly degraded beam quality and polarization losses in a resonator or master oscillator power amplifier (MOPA) device architecture. Correcting such aberrations is very difficult in general, and is dramatically more difficult as the power level for an SSL device is increased beyond the kilowatt level. In the present invention as disclosed, both the wavefront and the polarization of the beam from a fiber array driver can be independently controlled. By pre-distorting the wavefront and modifying the polarization state of the beam that is input to the SSL amplifier in a precisely controlled way, the aberrations in the SSL medium can be made to cancel exactly the wavefront pre-distortion and depolarization of the input beam and emit a diffraction limited, linearly polarized output beam.

Figure 2:
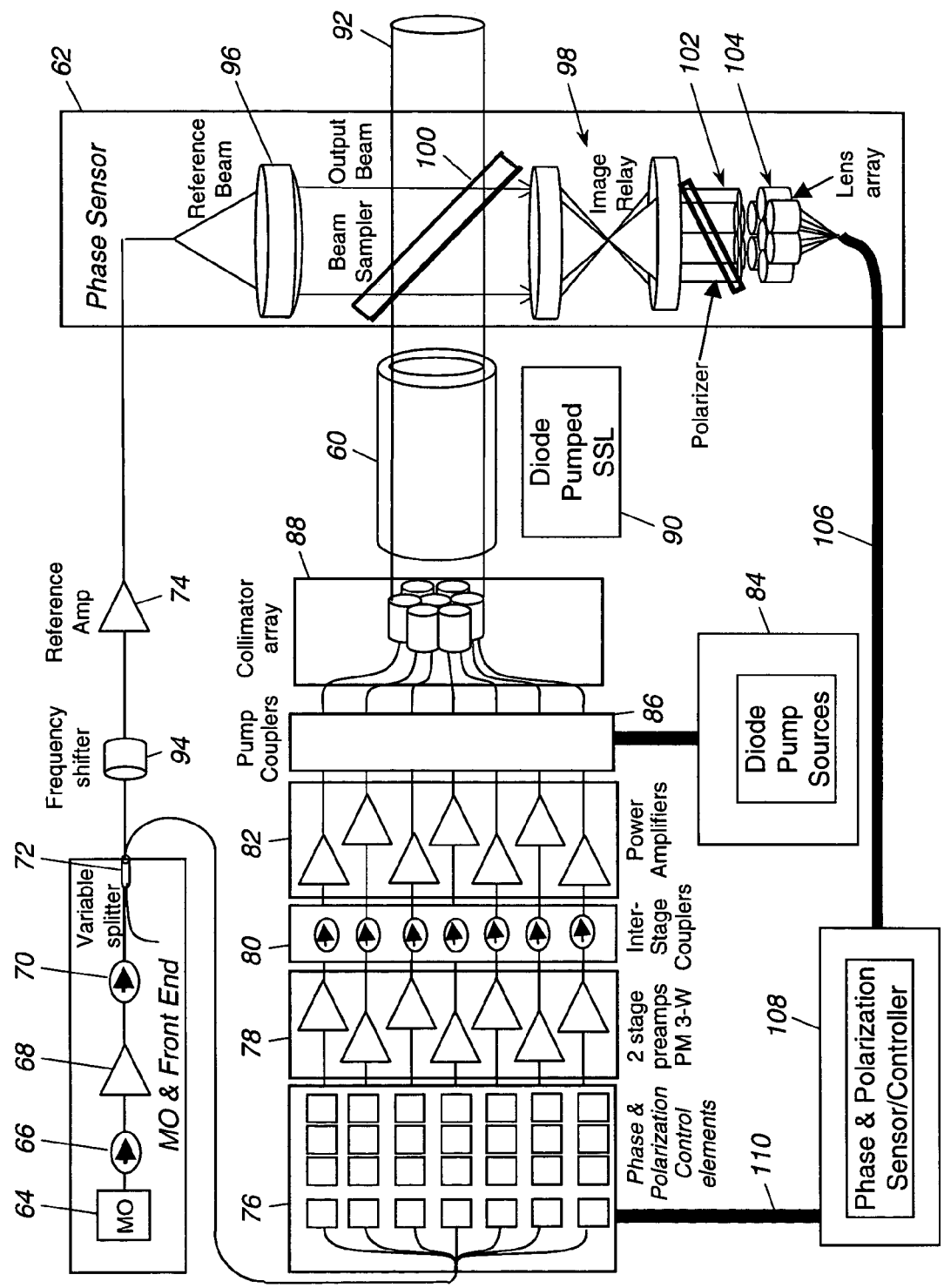
FIG. 2 is a schematic diagram hybrid laser source in accordance with the present invention.

FIG. 2 depicts a preferred embodiment of the invention, comprising three principal components: a solid state laser (SSL) 60, a laser fiber amplifier driver (comprising the components shown to the left of the SSL in FIG. 2), and a phase sensor 62. The "front end" of the laser source includes a master oscillator (MO) 64 coupled through an isolator 66 to a pre-splitter amplifier 68, which is in turn coupled though another isolator 70 to a variable splitter 72, which provides one optical signal to a reference amplifier 74, and multiple optical signals to an array of phase and polarization control elements 76. The multiple optical signals, after phase and polarization control, are input to an array of pre-amplifiers 78, and the outputs of the pre-amplifiers are coupled through interstage couplers 80 to an array of fiber amplifiers 82. The fiber amplifiers 82 are pumped by suitable diode pump sources 84, coupled to the amplifiers through pump couplers 86, and the amplifier outputs are coupled to a collimator array 88, which is a closely packed array of output lenses that launch a composite beam into the SSL 60, which is also pumped by suitable diodes 90.

The SSL 60 may be of any selected form. Although a cylindrical rod is shown, the SSL may be a slab, a disk, or any suitable bulk crystal device providing amplification of the input beam, to provide a high power output beam 92. The phase sensor 62 uses a reference beam derived from the reference amplifier 74, and frequency shifted by frequency shifter 94. The reference beam is focused by a lens 96 into an image relay 98. A partially reflective mirror 100 provides a sample of the output beam 92 to the image relay 98, which is coupled through a polarizer 102 to a lens array 104. Optical signals from the lens array 104 are coupled through fibers 106 a phase and an polarization sensor/controller 108, which generates phase and polarization control signals over lines 110 to the phase and polarization control elements 76.

The fiber array in the configuration of FIG. 2 can be operated with an arbitrary wavefront simply by measuring the phase of each emitter and driving it to the desired value. For example, the beam can be steered slightly by commanding a linear wavefront tilt, or focused by commanding an appropriate curvature, or to some pre-distorted shape that compensates the pump-induced thermo-optic distortions in the SSL medium.

The multi-element fiber array 82 emits a beam, through collimator array 88, that is directed through the SSL medium 60 that amplifies the beam, but also distorts and depolarizes it as the SSL medium is strongly pumped. The problems with beam formation are somewhat different depending on the SSL configuration, but the basic principle of the present invention is applicable to any SSL configuration. Moreover, multiple tandem SSL media can be compensated by the approach disclosed. The output beam 92 from the SSL 60 is sampled to determine the appropriate phase shifts and polarization states to apply to each fiber to generate a diffraction limited output beam in a well defined polarization state.

As illustrated in FIG. 2, the present invention provides for sensing polarization direction and phase simultaneously for the entire array of sub-beams. A key aspect of the invention is the capability to control the polarization state of each element in the driver array 82 such that the stress induced birefringence in the SSL medium 60 can be compensated. The technology required to achieve an arbitrary output polarization state from a single mode fiber is known, and its use was incorporated into a fiber amplifier array to compensate for fiber amplifier depolarization effects as taught in U.S. Pat. No. 6,317,257 (Wickham, et al.), the disclosures of which is hereby incorporated by reference into this document. U.S. Pat. No. 6,317,257 discloses a control system can be used, as an example, to drive the polarization state of each fiber amplifier in an array to an arbitrary desired state. In the present invention, the polarization state of each fiber emitter in the driver array 82 is driven to a polarization state that produces the desired output polarization state at its corresponding position in the output beam 92 emerging from the SSL medium 60. The polarization state of the emerging light is sensed in a way similar to the method used in the U.S. Pat. No. 6,317,257, and appropriate control signals are generated which adjust the fiber polarization state to produce the desired output polarization state from the SSL medium 60, element by element. The polarization control system is an orthogonal loop of low bandwidth that functions in conjunction with the wavefront control system. In the present invention, the SSL 60 medium is inserted between the driver array output from, the collimator array 88, and the wavefront/polarization sensor 62.

For purposes of explanation of the theory of operation of the hybrid laser source of the invention, the SSL medium 60 can be thought of as an ideal plate of thickness L and refractive index $n_0$, with aberrations and nonuniform birefringence induced by operating temperature gradients and associated stresses. For simplicity, assume that light propagates in the z-direction and the orthogonal axes are x and y. Ignoring diffraction effects, the light emerging at a point (x,y,L) experiences both nonuniform induced phase shift upon transmission and a change in polarization state as a result of pump induced refractive index variations and stress birefringence. The change in output polarization state is general, resulting in both a rotation of the birefringent axes and an induced retardation. Hence, the light can emerge in an elliptical polarization with the axes of the ellipse rotated at an angle θ with respect to the x-axis. The principal function of the present invention is to compensate the induced birefringence and wavefront error to generate the desired output wavefront in a controlled polarization state.

The control of the polarization can be accomplished by the method used in U.S. Pat. No. 6,317,257, although alternative methods for adjusting the polarization could be devised.

For single mode fiber applications such as this that require linearly polarized light, polarization controllers can easily be implemented to convert elliptically polarized light from single mode fiber into linearly polarized light, or in this case, from one polarization state to another. In a simple mechanical implementation of the basic approach, a prescribed number of fiber loops are coiled onto each of three paddles, and the three paddle angles are adjusted. These polarization controllers utilize stress-induced birefringence to create three independent fractional "wave plates" to alter the polarization of the transmitted light on single mode fiber. The fiber is looped into three independent spools, creating three independent fractional "wave plates" (fiber retarders). The amount of birefringence induced in the fiber is a function of the fiber cladding diameter, the fixed spool diameter, the number of fiber loops per spool, and the wavelength of the light. The desired birefringence is induced by the loop in the fiber, not by twisting of the fiber paddles. The fast axis of the fiber, which is in the plane of the spool, is adjusted with respect to the transmitted polarization vector by manually rotating the paddles. One example of a commercial fiber polarization controller using this principle is available as Part No. FPC561, manufactured by Thorlabs, Inc., 435 Route 206, Newton, N.J., 07860, USA.

In general, such devices may be configured to transform from one arbitrary state of polarization to another by loading the three paddles with a prescribed number of fiber loops to represent a nominal "quarter wave retarder," a "half wave retarder", and a "quarter wave retarder". In the process of polarization control, these rotations may be accomplished in an active monolithic waveguide device. Adjusting each of the three retarders allows complete control of the output polarization state; that is, the full Poincare sphere surface may be circumscribed, meaning that an arbitrary fast axis orientation and retardation can be achieved. The preferred embodiment of a phase and polarization controller is preferably implemented in lithium niobate, which can operate at very high speeds. The electro-optic properties of lithium niobate allow a similar effect to that of the mechanical polarization controller described above except that the lithium niobate implementation can operate much faster and requires no movement or mechanical interaction. Polarization and phase can be controlled by the appropriate application of voltages to various sections of a lithium niobate waveguide. Multiple element arrays can be manufactured using multiple lithium niobate waveguides.

As mentioned above, the hybrid laser disclosed herein can use rods, slabs or thin disks as the SSL medium 60. The effectiveness of phase and polarization control to form a diffraction limited beam 92 at the output of a physically extended SSL medium will degrade at some point due to diffractions effects. This is physically the same problem encountered in adaptive optics, the technology that enables a partial mitigation of atmospheric degradation of laser beams radiated from directed energy weapon systems. Distortions in a medium that is physically extended can not be totally corrected by a single deformable mirror. However, the judicious design of the optical train, using relay imaging of the driver array 82 into the SSL medium 60, or relay imaging of the input driver array through multiple SSL elements will compensate much of the degradation. The optimal SSL element 60 would be a thin disk amplifier onto which the output near field of the driver array might be imaged and re-imaged for successive stages. The output wavefront and polarization would be sensed at the exit pupil and corrections made by orthogonal control loops as described.

While described here as being compensated in a relatively slow control loop, the polarization could be deterministically switched or controlled rapidly using a high speed waveguide phase and polarization controller as mentioned above. This would enable active polarimetry and other active illumination applications. For example, in detecting and ranging to man-made objects, transmission of a polarization encoded pseudo noise (PN) code would return no signal from a natural object, which randomly depolarizes the return light, whereas a man-made object, which maintains a high degree of polarization in the reflected signal, would be detected and the range provided through correlation methods.

The Poincare Sphere is a useful tool for characterizing and understanding the polarization state of light, in this case a mode propagating down a fiber. The tool is well explained in the technical literature and will not be explained here. A position on the surface of the sphere represents the ellipticity of the light and the inclination, which is the orientation angle of the polarization axes. By inserting wave plates of a selected retardation value and with a selected orientation with respect to the reference axes, the point representing a polarization state can be moved on the surface of the sphere, and hence changing the polarization state of the light. Using Jones calculus, also well known in the art, to analyze the polarization state of light emerging from multiple waveplates oriented at arbitrary angles with respect to the reference axes, it can be shown that the transformation from one polarization state to another can be accomplished by rotating the angles of two waveplates and adjusting the retardation, or by rotating three waveplates of fixed retardations ($\pi/4$, $\pi/2$, $\pi/4$), as suggested above. Note that to get from one point on the surface of the Poincare Sphere to another, it is possible to use different waypoints, which is equivalent to appropriately changing the retardation and axes of orientation of intervening waveplates. There are essentially four equations in four unknowns to be solved. The equations involve the amplitude and phase of the x and y components of the input field while the unknowns are the orientation angles and retardations of the two waveplates required. If more waveplates are used, the problem is underconstrained and the desired polarization state transformation can be achieved with a range of settings. The specific designs for waveguide lithium niobate polarization control devices and the appropriate control algorithms required to produce an arbitrary polarization state changes in the input to the fiber amplifiers are known to those of ordinary skill the art of optical waveguides.

It will be appreciated from the foregoing that the present invention represents a significant improvement in the field of high power lasers. In particular, the invention combines the advantages of a simple solid state laser with a fiber laser array for precise control of both phase and polarization of the solid state laser output beam. It will also be appreciated that, although a specific embodiment of the invention has been described in detail for purposes of illustration, various modifications may be made without departing from the spirit and scope of the invention. Accordingly, the invention should not be limited except as by the appended claims.

The invention claimed is:

1. A laser source scalable to provide a high power output beam of good beam quality, the laser source comprising:
   a solid state laser amplifier providing a high power output beam;
   an array of laser fiber amplifiers providing an input beam to the solid state laser;
   a phase and polarization sensor, for sensing phase and polarization variations in a cross section of the output beam from the solid state laser; and
   means for controlling phase and polarization of elements of the array of laser fiber amplifiers, to achieve phase and polarization control through the cross section of the output beam;
   whereby precise phase and polarization control is effected even the output beam is of high power.

2. A laser source as defined in claim 1, wherein the phase and polarization sensor comprises:
   means for sampling the output beam throughout its cross section; and
   means for comparing the phase and polarization of output beam samples with a reference beam;
   and wherein the means for controlling phase and polarization comprises separate phase and polarization control elements for each element of the array of laser fiber amplifiers, and wherein the output beam phase and polarization is conformed to qualities of the reference beam.

3. A laser source as defined in claim 2, wherein the reference beam and multiple inputs to the array of laser fiber amplifiers are all derived from a common master oscillator.

4. A laser source as defined in claim 1, wherein the array of laser fiber amplifiers comprises:
   multiple inputs derived from a common master oscillator;
   a diode pump source coupled to the laser fiber amplifiers to provide pump power; and
   an array of collimating lenses coupled to corresponding fiber outputs and arranged in a closely packed configuration to launch the multiple fiber outputs as an input to the solid state laser.

5. A laser source as defined in claim 4, wherein:
   the solid state laser is diode pumped.

6. A laser source as defined in claim 4, wherein:
   the solid state laser is selected from the group consisting of a rod laser, a slab laser, a disk laser and a heat capacity laser.

7. A laser source as defined in claim 4, wherein the phase and polarization sensor comprises:
   a beam sampler for obtaining a sample of the output beam;
   a reference beam source derived from the common master oscillator;
   optical means for comparing the sample of the output beam with the reference beam; and
   a sensor lens array for spatially sampling the sensed phase and polarization differences across the output beam cross section.

8. A hybrid laser source scalable to high powers, the laser source comprising:
   a master oscillator and related amplifier producing a laser seed beam of desired quality and spectral content;
   a plurality of fiber laser amplifiers coupled to receive the laser seed beam derived from the master oscillator;
   a plurality of diode pump sources coupled to the fiber laser amplifiers to provide amplification;
   a collimator lens array coupled to receive output beams from the fiber laser amplifiers and configured in a compact configuration to provide a composite output beam from the fiber laser amplifiers;
   a solid state laser positioned to receive the composite output beam from the fiber laser amplifiers, and pumped by diodes to generate an amplified output beam;
   a phase and polarization sensor positioned in the solid state laser output beam and configured to produce a plurality of phase and polarization difference signals corresponding spatially to the positions of lenses in the collimator lens array;
   a phase and polarization controller, for generating electrical control signals to achieve a desired predistortion of phase and polarization of the optical beams input to the fiber laser amplifiers; and
   a plurality of phase and polarization control elements coupled to the fiber laser amplifier inputs to achieve the desired predistortion of phase and polarization.

9. A hybrid laser source as defined in claim 8, wherein the phase and polarization distortion signals applied to the fiber laser amplifier inputs are selected to conform the solid state laser output beam to the phase and polarization qualities of a reference beam derived from the master oscillator.

10. A hybrid laser source as defined in claim 8, wherein the phase and polarization distortion signals applied to the fiber laser amplifier inputs are selected to effect a desired wavefront tilt or other distortion in the solid state laser output beam.

11. A method for generating a laser beam of high power and good beam quality, comprising the steps of:
   generating a seed beam of desired beam quality and spectral content;
   applying the seed beam to multiple fiber laser amplifiers;
   pumping the fiber laser amplifiers to produce an array of amplified output beams from the fiber laser amplifiers;
   focusing the output beams from the fiber laser amplifiers into a solid state laser;
   pumping the solid state laser to produce a composite output beam;
   sampling the composite output beam and sensing phase and polarization differences at a plurality of spatial positions in a cross section of the composite output beam, the spatial positions corresponding to the positions of the fiber laser amplifiers providing input to the solid state laser;
   generating phase and polarization control signals corresponding to the sensed polarization differences; and
   predistorting the phase and polarization of the seed beam applied to the inputs of the fiber laser amplifiers, to achieve desired phase and polarization properties in the output beam from the solid state amplifier.

12. A method as defined in claim 11, wherein:
   the sensed phase and polarization differences result from a comparison between the phase and polarization of a reference signal and the phase and polarization properties sampled in the cross section of the solid state laser output signal; and
   the step of predistorting the phase and polarization has the effect of compensating of phase and polarization distortions arising in the solid state laser.

13. A method as defined in claim 11, wherein:
   the step of predistorting the phase and polarization has the effect of achieving a desired change in wavefront tilt or focus of the solid state laser output beam.

* * * * *